Aug. 28, 1962     J. A. MUTH     3,051,317
STRAINING DEVICE
Filed March 14, 1960

INVENTOR
JAMES A. MUTH
by Houston L. Swenson
ATTORNEY

United States Patent Office 3,051,317
Patented Aug. 28, 1962

3,051,317
STRAINING DEVICE
James A. Muth, 7850 Fond du Lac Road,
Rte. 2, Oshkosh, Wis.
Filed Mar. 14, 1960, Ser. No. 14,842
3 Claims. (Cl. 210—409)

This invention relates to a fluid straining device and in particular to a device which is self-cleaning.

In the prior art there have been numerous arrangements for straining devices which are used to filter out organic impurities in the size range of bugs and leaf particles. Generally these strainers have been positioned within the conduit transmitting the fluid that is to be strained. While such filtering devices have served well in filtering out impurities, they have required considerable maintenance. Depending upon the quantity of impurities in the fluid, the straining material will become clogged and in due time cause a reduction in fluid flow approaching a stoppage. Consequently, a periodic inspection of the strainer has been required accompanied with a shutdown to remove the impurities imbedded in the filtering material which may be a conventional screen material. Not only is such a practice expensive, but it also requires a filtering unit which is easily disassembled in order to clean out the screen.

The straining device in this invention overcomes the need for shutdowns inasmuch as it is of the self-cleaning type and does not become clogged.

It is therefore one object of this invention to provide a new and improved straining device which requires a minimum of maintenance.

Another object of this invention is to provide a new and improved straining device which is self-cleaning.

Objects and advantages other than those mentioned above will be apparent from the following description when read in connection with the drawing in which.

Figure 2:
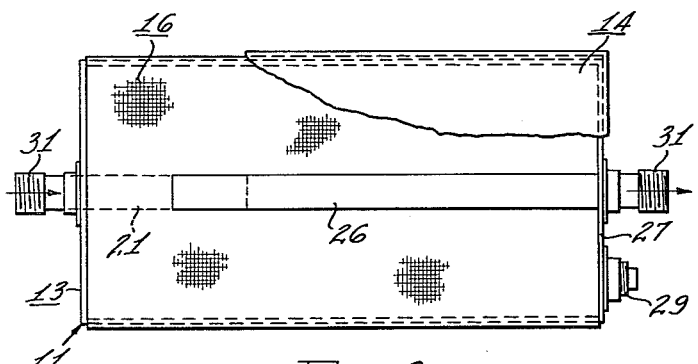
FIGURE 2 is a partially cutaway plan view.
Figure 1:
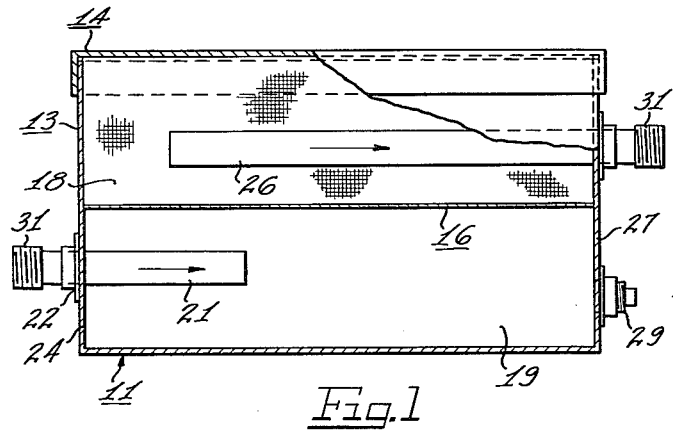
FIGURE 1 is a partially cutaway front elevation view of the straining device of this invention.
Figure 3:
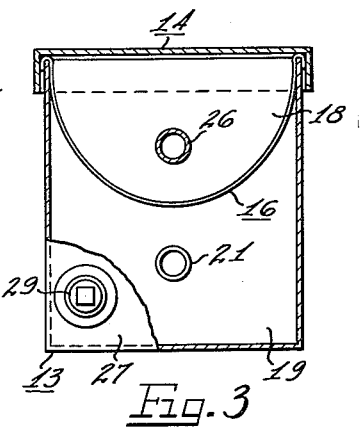
FIGURE 3 is a partially cutaway right-hand end view.

The illustrated embodiment comprises a hollow body 11 consisting of a receptacle member 13 and a top 14. The two members are joined together in a conventional sealing manner and may include a gasket (not shown) disposed between them in order that a pressurized liquid such as water will not leak from the hollow body 11. Mounted within the hollow body is a filtering material such as a screen 16 or any other mesh material having holes of a size capable of preventing passage of impurities. Although the illustrated embodiment shows the screen mounted between the cover 14 and receptacle member 13 the screen may also be mounted in other ways such as by securing it to the inner sides of the hollow body. The screen divides the hollow body into an upper section 18 and a lower section 19 and may be either of a curved or trough-like configuration as illustrated, or flat. The curved arrangement is generally preferable inasmuch as a greater screening area is obtained.

Inwardly extending into the lower section 19 is an inlet conduit 21. There are numerous sealing means well known in the art that may be used to prevent leakage of the liquid at its entrance point 22 in wall 24 of the hollow body. For maximum cleaning efficiency, the inlet conduit is substantially parallel to the screen 16. An outlet conduit 26 extends through a second wall 27 opposed to the first wall. In like manner this conduit also cooperates with the wall 27 at its exit point to form a watertight joint. The outlet conduit 26 is positioned in the upper section 18 and may be aligned in a parallel position with respect to the inlet conduit 21 and the screen 16. Similar to the inlet conduit, the outlet conduit extends into the hollow body and is in an overlapping relationship with the inlet conduit. While the two conduits may terminate just short of each other at points in near proximity, it is preferable that they overlap. One satisfactory arrangement may be obtained by providing the inlet conduit with an interior portion which is approximately one-third the length of the hollow body. The interior portion of the outlet conuit may be approximately three-fourths the length of the hollow body, thereby assuring an overlapping of the two conduits.

Near the bottom of the hollow body and in the wall 27 containing the outlet conduit 26 is a drain plug 29. The drain plug provides a means for flushing out sediment which, over a long period, will acculmulate on the bottom of the hollow body.

In operation the straining device may be inserted in a conduit transmitting liquid through the use of conventional threaded joints 31. Liquid under pressure enters the inlet conduit 21 and is slammed against the opposite wall 27. The force of the liquid causes it to become turbulent and in short order the hollow body is quickly filled with the swirling liquid. Due to the overlapping effect of the two conduits, the liquid is forced to backtrack in order to enter the outlet conduit 26. The screen 16 disposed between the two conduits causes filtering of the liquid prior to its exit. Because of the manner in which the two conduits and screen are arranged within the hollow body, the straining device of this invention is self-cleaning. As liquid seeks to enter the outlet conduit, its impurities are removed as they strike the underneath side of the screen. In the prior art, a substantial portion of liquid flow in self-cleaning strainers was directed on a line perpendicular to the screening element. Consequently, impurities eventually accumulated on the screen and had no chance to become dislodged due to the oncoming fluid which held the impurities against the screen.

The device of this invention provides liquid flow on both sides of the screen which is substantially parallel to the screen. The effect of this is that particles lodged in the screen from the first quantity of liquid admitted into the strainer is removed from the screen by the oncoming flow of liquid from the inlet conduit 21. Simultaneously cooperating with this incoming parallel flow is a second parallel flow seeking the outlet conduit 26 and acting in an opposed manner in the upper section 18 as it seeks the outlet conduit. The result is a dual wiping or abrasive action applied substantially parallel to both sides of the screen and acting in opposed directions. The turbulent effect of the liquid created as it slams against the far wall 27 also adds to this dual wiping action to further remove particles imbedded in the screen. Thus, substantially all flow of liquid perpendicular to the screen is avoided thereby minimizing the force of liquid exerted on the particles in a direction towards the screen.

As the particles are disengaged from the screen by the two opposing liquid flows, they tend to settle to the bottom of the hollow body due to gravity action. In time, depending upon the degree of impurities contained in the liquid being transmitted, a large quantity of impurities will collect on the bottom and tend to impede the cleansing action of the liquid within the hollow body. To avoid such occurrences, the drain plug 29 may be momentarily opened while liquid is still being passed through the straining device. The force of the incoming liquid is then directed towards this new opening and will carry along the impurities that have settled out. This flushing can be accomplished in a matter of seconds and the continuity of liquid flow can thereby be kept largely intact.

Although only one embodiment has been illustrated and described, it will be apparent to those skilled in the art that various changes and modifications may be made therein without departing from the spirit of the invention and the scope of the appended claims.

What is claimed is:

1. A device for filtering out impurities in a liquid under pressure comprising a hollow body having an inlet chamber and an outlet chamber disposed therein, a screen of predetermined uniform thickness mounted within said hollow body and separating said inlet and outlet chambers, an inwardly extending inlet conduit mounted in said inlet chamber substantially parallel to said screen on a first wall of said hollow body, and an outlet conduit extending through a second wall of said body oppositely disposed to said first wall and to said inlet conduit and into said outlet chamber in an overlapping and substantially parallel relationship with said inlet conduit, said inlet conduit opening toward said second wall and said outlet conduit opening toward said first wall whereby the fluid from said inlet conduit is forcibly directed toward said second wall and the flow thereof reversed in said housing causing impurities to be dislodged from said screen by the opposite forces of liquid in said compartments.

2. The apparatus of claim 1 wherein the screen is of trough like configuration.

3. The apparatus of claim 1 wherein the screen is of a curved trough like configuration.

References Cited in the file of this patent

UNITED STATES PATENTS

| | | |
|---|---|---|
| 555,482 | Hussey | Feb. 25, 1896 |
| 1,297,978 | Teeling | Mar. 18, 1919 |
| 1,424,197 | Gebhard | Aug. 1, 1922 |
| 1,460,867 | Strowbridge | July 3, 1923 |
| 2,644,585 | Ambrosi | July 7, 1953 |

FOREIGN PATENTS

| | | |
|---|---|---|
| 18,957 | Great Britain | Nov. 22, 1890 |